United States Patent
Narita

(12) 
(10) Patent No.: US 10,605,376 B2
(45) Date of Patent: Mar. 31, 2020

(54) ELECTRIC ACTUATOR WITH PRIORTIZED CHARGING FOR ELECTRIC VALVE RETURN

(71) Applicant: Azbil Corporation, Tokyo (JP)

(72) Inventor: Hiroaki Narita, Tokyo (JP)

(73) Assignee: Azbil Corporation, Tokyo (JP)

( * ) Notice: Subject to any disclaimer, the term of this patent is extended or adjusted under 35 U.S.C. 154(b) by 0 days.

(21) Appl. No.: 16/052,828

(22) Filed: Aug. 2, 2018

(65) Prior Publication Data
US 2019/0049036 A1 Feb. 14, 2019

(30) Foreign Application Priority Data
Aug. 8, 2017 (JP) ................. 2017-153278

(51) Int. Cl.
| F16K 31/06 | (2006.01) |
| H02J 7/00 | (2006.01) |
| F16K 31/04 | (2006.01) |
| H02J 7/34 | (2006.01) |

(52) U.S. Cl.
CPC ........ *F16K 31/0675* (2013.01); *F16K 31/046* (2013.01); *H02J 7/0013* (2013.01); *H02J 7/0063* (2013.01); *H02J 7/345* (2013.01)

(58) Field of Classification Search
CPC .. F16K 31/0675; F16K 31/046; H02J 7/0063; H02J 7/345; H02J 7/0013
USPC ..... 251/129.04; 320/166–167, 149, 160, 155
See application file for complete search history.

(56) References Cited

U.S. PATENT DOCUMENTS

| 8,473,229 | B2 * | 6/2013 | Kucera | ................ G01R 31/392 702/58 |
| 8,973,595 | B2 * | 3/2015 | Neilson | ................... F16K 31/06 137/1 |
| 9,000,733 | B2 | 4/2015 | Narita | |

FOREIGN PATENT DOCUMENTS

JP          5793400 B2     10/2015

* cited by examiner

*Primary Examiner* — John Bastianelli
(74) *Attorney, Agent, or Firm* — Amster, Rothstein & Ebenstein LLP

(57) ABSTRACT

An electric actuator comprises an electricity storing portion that stores electric energy, a charging portion that charges the electricity storing portion when the electric actuator is energized by receiving electric power from outside, and a controlling portion that controls the entire actuator. The controlling portion controls the opening degree of a valve according to an opening degree target value when the electric actuator is energized and operates the valve to a desired opening position using energy stored in the electricity storing portion when interruption of electric service occurs. In addition, the controlling portion causes the charging portion to start charging of the electricity storing portion when a charge waiting time that depends on predetermined priority of charging has elapsed after electric power is turned on.

2 Claims, 12 Drawing Sheets

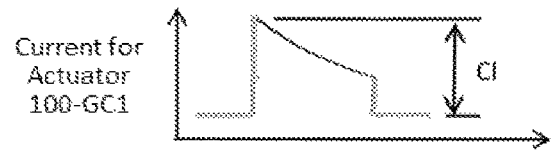
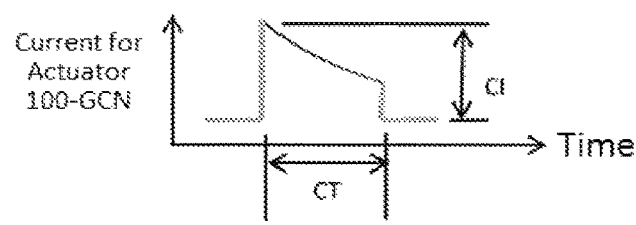
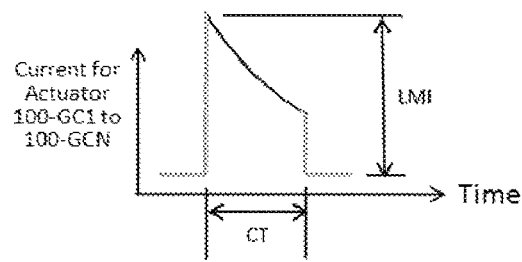
Fig. 9(A)	Fig. 9(B)
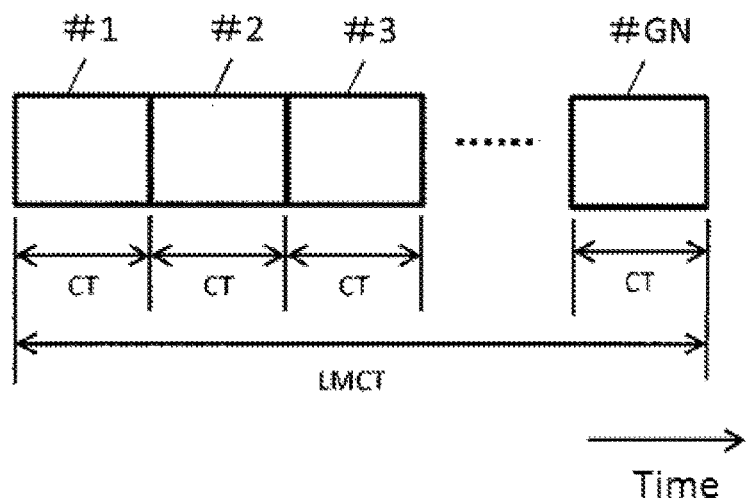
Fig. 10

ELECTRIC ACTUATOR WITH PRIORTIZED CHARGING FOR ELECTRIC VALVE RETURN

CROSS-REFERENCE TO RELATED APPLICATION

The present application claims the benefit of and priority to Japanese Patent Application No. 2017-153278, filed on Aug. 8, 2017, the entire contents of which are incorporated by reference herein.

TECHNICAL FIELD

The present invention relates to an electric actuator that returns a valve to a predetermined opening position by forcibly driving a motor using electric energy stored in an electricity storing portion when interruption of electric service occurs.

BACKGROUND

At present, there is a spring return actuator that uses a spring to forcibly operate a valve to a fully closing direction when interruption of electric service occurs. A spring return actuator has problems in that (I) power consumption is large because a motor for generating a large torque is necessary to obtain the load torque for driving a valve and the torque for winding a spring, (II) the target position during interruption of electric service can be set to only a fully closed position and cannot be set to a fully open position or another position, and (III) mechanisms, such as a clutch and a brake, for controlling operation during interruption of electric service are necessary, for example.

As means for solving these problems, there is proposed an electric actuator that returns the valve to a predetermined opening position by forcibly driving a motor during interruption of electric service using electric energy stored in an electricity storing portion, such as an electric double layer capacitor (see PTL 1).

Such an electric actuator eliminates the need to wind a spring using the rotating force of a motor. However, when a plurality of electric actuators 300-1 to 300-N are connected to one power supply system 301 as illustrated in FIG. 13, if an attempt is made to charge the electricity storing portions of the electric actuators 300-1 to 300-N all together when the electric power is turned on to reduce charge time, a problem occurs in that a relatively large charge current flows through the electric actuators 300-1 to 300-N, as illustrated in FIG. 14, so a power switchboard 302 needs to have a breaker with a large current capacity.

In addition, if an attempt is made to charge the electricity storing portions of the electric actuators 300-1 to 300-N in sequence after the electric power is turned on, a problem occurs in that the charge time until all of the electricity storing portions of the electric actuators 300-1 to 300-N have been charged becomes long, as is clear from FIG. 15 because charge time is relatively long.

CITATION LIST

Patent Literature

[PTL 1] Japanese Patent No. 5793400

SUMMARY

The invention addresses the above problems with an object of optimizing the current capacity required for a power supply system and the total charge time of a plurality of electric actuators when the electric actuators are connected to one power supply.

An electric actuator according to the invention comprises an opening degree controlling portion that controls an opening degree of a valve according to an opening degree target value when the electric actuator is energized by receiving electric power from outside (e.g., an external power supply system), an electricity storing portion that stores electric energy; a charging portion that charges the electricity storing portion when the electric actuator is energized; a return controlling portion that operates the valve to a predetermined opening position using the electric energy stored in the electricity storing portion when the electric power is shut off and interruption of electric service occurs; and a charge controlling portion that causes the charging portion to start charging of the electricity storing portion when a charge waiting time determined according to a predetermined priority of charging has elapsed after the electric power is turned on.

In addition, one example of the structure of the electric actuator according to the invention further comprises a storing portion that stores, in advance, a charge number corresponding to the priority and a charge time required to charge the electricity storing portion, in which the charge controlling portion calculates the charge waiting time based on the charge number and the charge time and causes the charging portion to start charging of the electricity storing portion when the charge waiting time has elapsed after the electric power is turned on.

In addition, in one example of the structure of the electric actuator according to the invention, when a plurality of the electric actuators are connected to one power supply system, the electric actuators are divided into groups so that the total current flowing from the power supply system to the electric actuators is equal to or less than a maximum allowable current capacity value and the electric actuator having a higher priority is charged earlier, and the charge number corresponding to each of the groups is preset in the storing portion.

In addition, in one example of the structure of the electric actuator according to the invention, when a plurality of the electric actuators are connected to one power supply system, the electric actuators are divided into groups so that the total time required to charge the electric actuators is equal to or less than a maximum allowable charge time and the electric actuator having a higher priority is charged earlier, and the charge number corresponding to each of the groups is preset in the storing portion.

Since the charging portion starts charging of the electricity storing portion when the charge waiting time that depends on a predetermined priority of charging has elapsed after electric power is turned on according to the invention, the current capacity required for the power supply system and the power switchboard and the total charge time of the electric actuators can be optimized when a plurality of electric actuators are connected to one power supply system.

BRIEF DESCRIPTION OF THE DRAWINGS

FIG. 3 is a flowchart illustrating the operation of the electric actuator according to the first embodiment of the invention when the electric power is turned on.

FIGS. 9(A) and 9(B) are graphs used to describe a charging method that uses an RC series circuit.

FIG. 10 is a drawing used to describe the maximum charge time when electricity storing portions of the electric actuators are charged for each group.

DETAILED DESCRIPTION

First Embodiment

Figure 1:
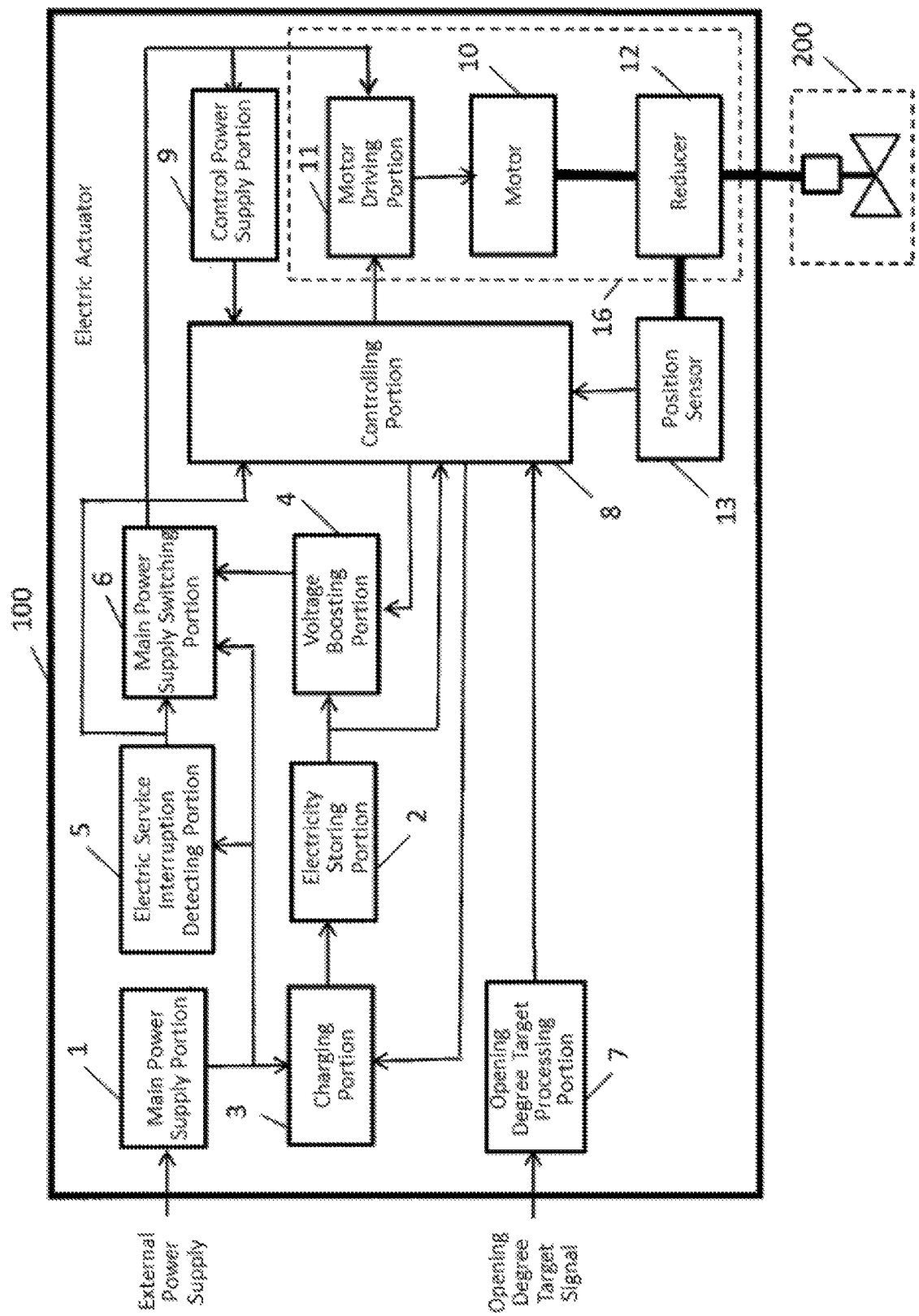
FIG. 1 is a block diagram illustrating the structure of an electric actuator according to a first embodiment of the invention.

An embodiment of the invention will be described below with reference to the drawings. FIG. 1 is a block diagram illustrating the structure of the electric actuator according to the first embodiment of the invention. An electric actuator 100 is attached to a valve 200, such as a ball valve or a butterfly valve, and they are integrated as an electric regulating valve. In addition, the electric actuator 100 exchanges information with a controller (not shown).

The electric actuator 100 comprises a main power supply portion 1 that generates a main power supply voltage from a power supply voltage supplied from an external power supply (not shown), an electricity storing portion 2 that comprises an electric double layer capacitor in which electric energy is stored, a charging portion 3 that charges the electricity storing portion 2 when the electric actuator is energized by receiving electric power from outside (external power supply), a voltage boosting portion 4 that boosts the voltage of the electricity storing portion 2, an electric service interruption detecting portion 5 that detects interruption of the electric power from outside (external power supply), a main power supply switching portion 6 that selects and outputs either the main power supply voltage from the main power supply portion 1 or the boosted power supply voltage from the voltage boosting portion 4, an opening degree target processing portion 7 that processes an opening degree target signal from a controller and outputs an opening degree target value to a controlling portion 8, the controlling portion 8 that controls the entire electric actuator 100, a control power supply portion 9 that generates a control system power supply voltage, a motor 10 that operates according to a driving voltage, a motor driving portion 11 that outputs a driving voltage to the motor 10 according to a control signal from the controlling portion 8, a reducer 12 that operates the valve 200 by reducing the output of the motor 10, and a position sensor 13 that measures the opening degree of the valve 200. The motor 10, the motor driving portion 11, and the reducer 12 constitute a driving portion 16.

Figure 2:
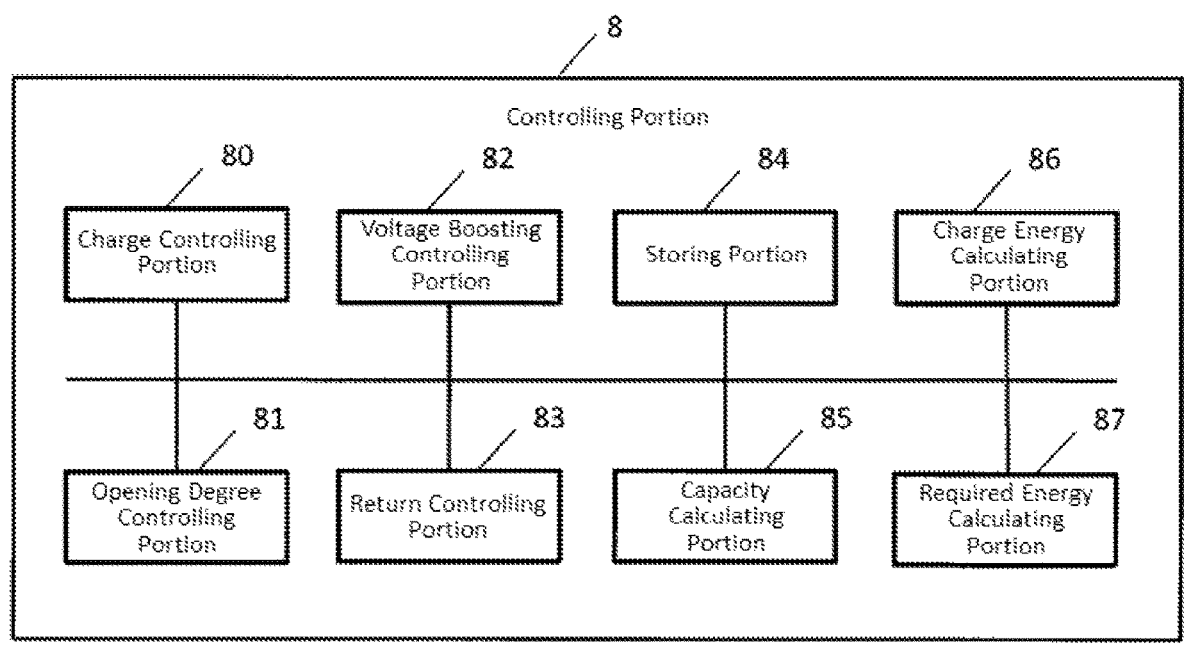
FIG. 2 is a block diagram illustrating the structure of a controlling portion of the electric actuator according to the first embodiment of the invention.

FIG. 2 is a block diagram illustrating the structure of the controlling portion 8. The controlling portion 8 comprises a charge controlling portion 80 that causes the charging portion 3 to start the charging of the electricity storing portion 2 when a charge waiting time has elapsed after electric power is turned on, an opening degree controlling portion 81 that controls the opening degree of the valve 200 according to the opening degree target value when the electric actuator 100 is energized by receiving the electric power from outside (external power supply), a voltage boosting controlling portion 82 that outputs a voltage boosting enable signal to the voltage boosting portion 4 when interruption of electric service occurs, a return controlling portion 83 that operates the valve 200 to a desired opening position using the energy stored in the electricity storing portion 2 when interruption of electric service occurs, a storing portion 84 that stores information, a capacity calculating portion 85 that calculates the capacity of the electricity storing portion 2, a charge energy calculating portion 86 that calculates the value of the energy stored in the electricity storing portion 2, and a required energy calculating portion 87 that calculates the value of energy required to operate the valve 200 from the position indicated by the opening degree target value to a desired opening position when the electric power is turned on.

Figure 3:
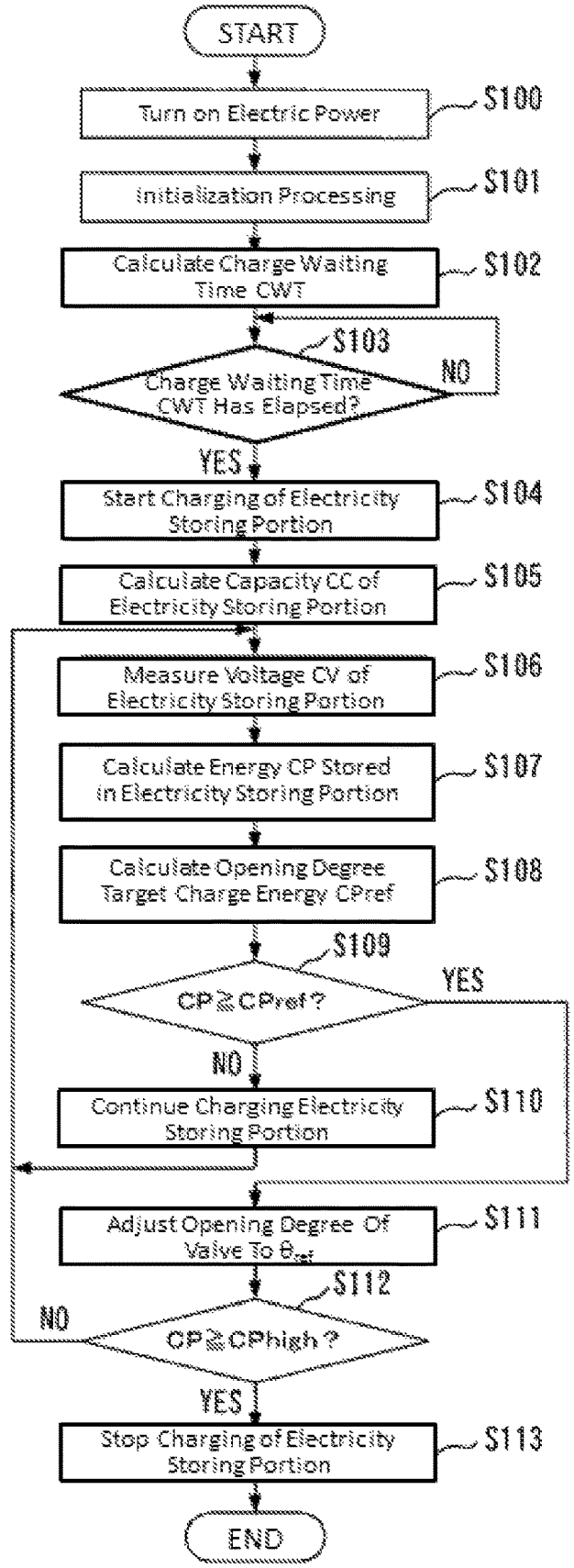

The operation of the electric actuator 100 according to the embodiment will be described below. FIG. 3 is a flowchart illustrating the operation of the electric actuator 100 when the electric power is turned on.

When receiving a power supply voltage from the external power supply (not shown), the main power supply portion 1 generates a predetermined main power supply voltage from this power supply voltage (step S100 in FIG. 3). It should be noted here that the power supply voltage supplied from the external power supply may be an AC or DC voltage. When an AC power supply voltage is supplied from the external power supply, it is enough for the main power supply portion 1 to generate a desired main power supply voltage by internally rectifying, smoothing, and reducing the AC voltage. Since the main power supply portion 1 supplies the main power supply voltage, the electric service interruption detecting portion 5 does not output an electric service interruption detection signal.

Since the electric service interruption detection signal is not input from the electric service interruption detecting portion 5, the main power supply switching portion 6 selects and outputs the main power supply voltage from the main power supply portion 1. This supplies the main power supply voltage to the control power supply portion 9 and the motor driving portion 11 via the main power supply switching portion 6. The control power supply portion 9 generates a predetermined control system power supply voltage from the main power supply voltage. The controlling portion 8 starts up by receiving the control system power supply voltage from the control power supply portion 9.

The controlling portion 8 performs initialization processing that reads programs from the storing portion 84 for the operation described later and reads a charge number CN corresponding to the priority of the local device (electric actuator 100) among a plurality of electric actuators connected to a single power supply system to which the local device is connected and a standard charge time CT (generally the longest time required to charge the electricity storing portion 2) that represents the standard time required to charge the electricity storing portion 2 (step S101 in FIG. 3). The charge controlling portion 80 of the controlling portion 8 calculates a charge waiting time CWT using the following expression (1) based on the charge number CN and the standard charge time CT read from the storing portion 84 (step S102 in FIG. 3).

$$CWT = CN \times CT \qquad (1)$$

Then, the charge controlling portion 80 waits until the charge waiting time CWT has elapsed. When the charge waiting time CWT has elapsed after the electric power is turned on (at startup) (YES in step S103 in FIG. 3), the charge controlling portion 80 outputs a charge enable signal to the charging portion 3 (step S104 in FIG. 3). The charging portion 3 starts the charging of the electricity storing portion 2 by receiving the main power supply voltage from the main power supply portion 1 and outputting the charge current to the electricity storing portion 2 according to the output of this charge enable signal.

In addition, when the controlling portion 8 starts up, the opening degree controlling portion 81 of the controlling portion 8 obtains an opening degree target value $\theta_{ref}$ (in degrees, °) of the valve 200 from the opening degree target processing portion 7. The opening degree target processing portion 7 operates by receiving the main power supply voltage from the main power supply portion 1, receives an opening degree target signal from a controller (not shown), and outputs the opening degree target value $\theta_{ref}$ (in degrees, °) indicated by this opening degree target signal to the controlling portion 8.

Next, the capacity calculating portion 85 of the controlling portion 8 calculates the capacity of the electricity storing portion 2 (step S105 in FIG. 3). Since an electric double layer capacitor is used as the electricity storing portion 2 in the embodiment, the capacity value of the electricity storing portion 2 is a capacitance value CC (in farads, F) of the electric double layer capacitor. The operation of the capacity calculating portion 85 will be described with reference to FIG. 4.

Figure 4:
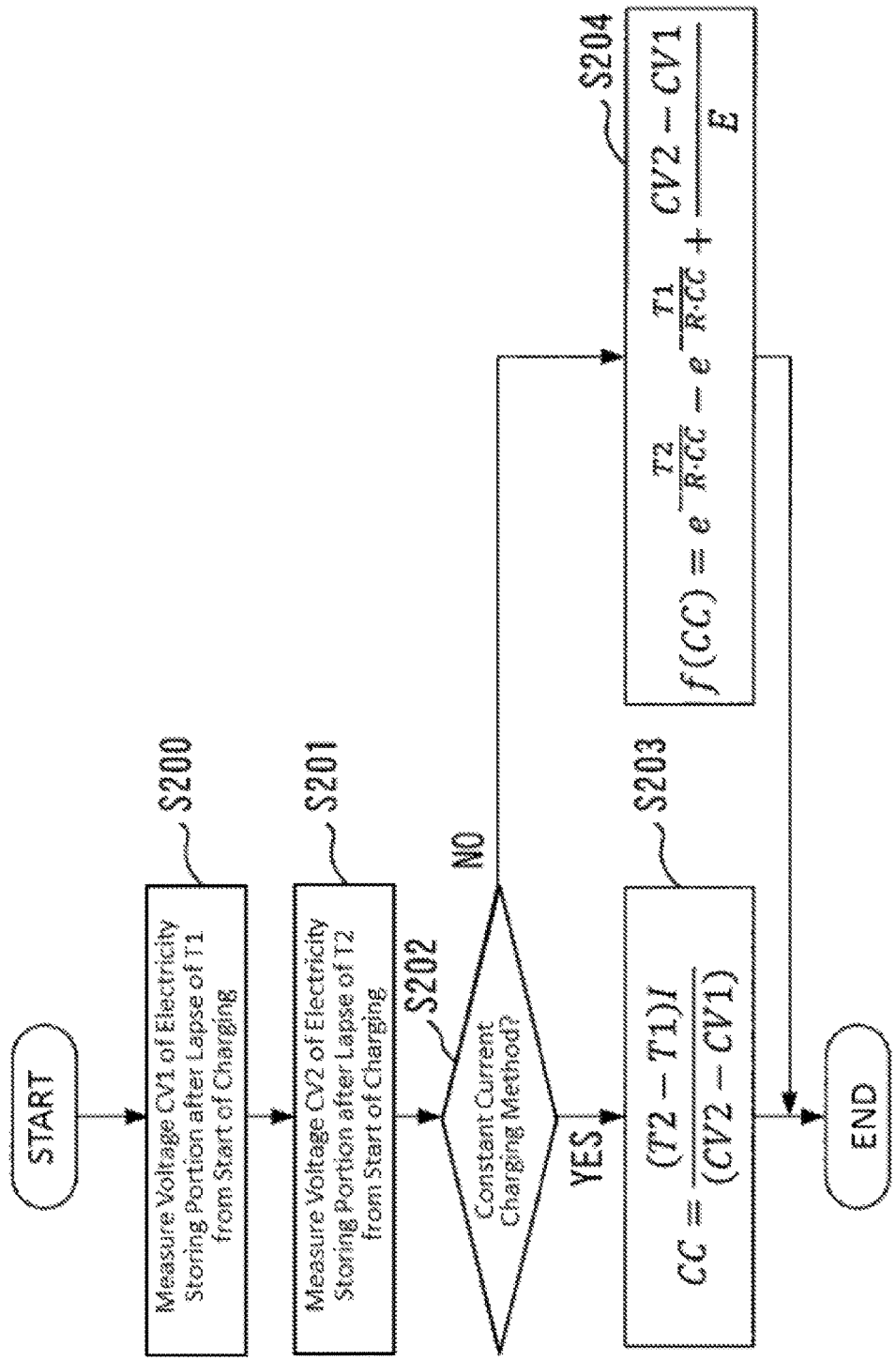
FIG. 4 is a flowchart illustrating the operation of a capacity calculating portion of the controlling portion according to the first embodiment of the invention.

First, the capacity calculating portion 85 measures the stored voltage (the inter-terminal voltage of the electric double layer capacitor) CV1 (in volts, V) of the electricity storing portion 2 after a lapse of time T1 (in seconds, s) from the start of charging (step S200 in FIG. 4). Next, the capacity calculating portion 85 measures the stored voltage CV2 (in volts, V) of the electricity storing portion 2 after a lapse of time T2 (in seconds, s) from the start of charging (step S201 in FIG. 4). It will be appreciated that T2>T1 holds.

Then, the capacity calculating portion 85 calculates the capacity value (the capacitance value of the electric double layer capacitor) CC (in farads, F) of the electricity storing portion 2 based on the measured stored voltages CV1 and CV2 (in volts, V). When the charging method for the electricity storing portion 2 by the charging portion 3 is the constant current charging method (YES in step S202 in FIG. 4), the capacity calculating portion 85 calculates the capacity value CC (in farads, F) using expression (2) below (step S203 in FIG. 4).

[Math. 1]
$$CC = \frac{(T2 - T1)I}{(CV2 - CV1)} \qquad (2)$$

In the method that charges the electricity storing portion 2 with constant current I (constant current charging method) (YES in step S202), the capacity calculating portion 85 calculates the capacity value CC (in farads, F) using expression (2) (step S203 in FIG. 4). In addition, in the method (method in which the charge current changes with time) that charges the electricity storing portion 2 using an RC series circuit comprising the resistor of the charging portion 3 and the double layer capacitor of the electricity storing portion 2 (NO in step S202), the capacity calculating portion 85 calculates the capacity value CC (in farads, F) using expression (3) below (step S204 in FIG. 4).

[Math. 2]
$$f(CC) = e^{-\frac{T2}{R \cdot CC}} - e^{-\frac{T1}{R \cdot CC}} + \frac{CV2 - CV1}{E} \qquad (3)$$

In expression (3), R (in ohms, Ω) represents the resistance value of the resistor of the charging portion 3 and E represents the charging power supply voltage value applied to the RC series circuit by the charging portion 3. Since f(CC) in expression (3) surely has a solution for 0<CC<CCmax, the capacity value CC (in farads, F) can be calculated by obtaining the solution using numerical analysis, such as the Bisection method or Newton's method (CCmax (in farads, F) is the maximum value in the initial capacitance range). Now, the processing by the capacity calculating portion 85 is completed.

Next, the charge energy calculating portion 86 of the controlling portion 8 calculates energy CP (in joules, J) stored in the electricity storing portion 2. Specifically, the charge energy calculating portion 86 measures the stored voltage CV (in volts, V) of the electricity storing portion 2 (step S106 in FIG. 3). Then, the charge energy calculating portion 86 calculates the energy CP (in joules, J) using expression (4) based on the capacity value CC (in farads, F) of the electricity storing portion 2 calculated by the capacity calculating portion 85 and the measured stored voltage CV (in volts, V) (step S107 in FIG. 3).

[Math. 3]
$$CP = \frac{CV^2 \cdot CC}{2} \qquad (4)$$

The required energy calculating portion 87 of the controlling portion 8 calculates opening degree target charge energy CPref (in joules, J), which is the energy required to return the valve 200 to a desired opening position (the fully closed position in the embodiment) from the current target opening position using expression (5) (step S108 in FIG. 3).

[Math. 4]

$$CPref = \left(\frac{MT \cdot \frac{2\pi N}{60}}{\eta_{mc}\eta_{mp}\eta_{ps}} + \frac{CTP}{\eta_{ps}}\right)\left(\frac{\theta_{ref}T_{open}}{\theta_{open}}\right) \quad (5)$$

In expression (5), MT (in newton meters, N·m) represents the load torque value of a known valve stem of the valve 200, N (in revolutions per minute, rpm) represents the known number of revolutions of the valve stem of the valve 200 driven by the reducer 12, CTP (in watts, W) represents the known electric power value (the power consumption value of the return controlling portion 83 and the voltage boosting controlling portion 82 that operate when interruption of electric service occurs) consumed by the controlling portion 8, $\theta_{open}$ (in degrees, °) represents the fully open opening value of the valve 200, $T_{open}$ (in seconds, s) represents the fully open operation time value, which is the known time required for the valve 200 to reach the fully open position from the fully closed position, $\eta_{mc}$ (in a percentage, %) represents the known machine efficiency of the reducer 12, $\eta_{mt}$ (in a percentage, %) represents the known efficiency of the motor 10, and $\eta_{ps}$ (in a percentage, %) represents the known efficiency of the voltage boosting portion 4. The torque MT (in newton meters, N·m), the number N of revolutions (in revolutions per minute, rpm), the fully open operation time $T_{open}$ (in seconds, s), the machine efficiency $\eta_{mc}$ (in a percentage, %) of the reducer 12, and the efficiency $\eta_{mt}$ (in a percentage, %) of the motor 10 represent the performance of the driving portion 16.

When CP<CPref holds, that is, the energy CP (in joules, J) stored in the electricity storing portion 2 does not reach the opening degree target charge energy CPref (in joules, J) (NO in step S109 in FIG. 3), the charge controlling portion 80 of the controlling portion 8 decides that the charging required to return the valve 200 is insufficient, continues outputting the charge enable signal, and causes the charging portion 3 to continue charging the electricity storing portion 2 (step S110 in FIG. 3).

In this way, the processing from steps S106 to S110 are repeatedly executed until the energy CP (in joules, J) stored in the electricity storing portion 2 reaches the opening degree target charge energy CPref (in joules, J).

When CP≥CPref holds, that is, the energy CP (in joules, J) stored in the electricity storing portion 2 is equal to or more than the opening degree target charge energy CPref (in joules, J) (YES in step S109), the opening degree controlling portion 81 of the controlling portion 8 compares the opening degree target value $\theta_{ref}$ with an actual measurement value (actual opening) of the opening degree of the valve 200 measured by the position sensor 13 and outputs a motor control signal to the motor driving portion 11 so that the opening degree target value $\theta_{ref}$ coincides with the actual opening. The motor driving portion 11 outputs a driving voltage to the motor 10 according to the motor control signal. This drives the motor 10, the driving force of the motor 10 is transmitted to the valve stem of the valve 200 via the reducer 12, and the opening degree of the valve 200 is adjusted by operating a valve body attached pivotally to this valve stem. In this way, the opening degree of the valve 200 is adjusted to $\theta_{ref}$ (in degrees, °) (step S111 in FIG. 3). The position sensor 13 detects the amount of displacement of the valve stem of the valve 200 via the reducer 12 and transmits the actual measurement value (actual opening) of the valve opening degree to the controlling portion 8.

Next, when CP<CPhigh holds, that is, the energy CP (in joules, J) stored in the electricity storing portion 2 does not reach a predetermined charge energy upper limit value CPhigh (in joules, J) (NO in step S112 in FIG. 3), the charge controlling portion 80 of the controlling portion 8 returns to step S106.

In this way, the processing from steps S106 to S112 are repeatedly executed until the energy CP (in joules, J) stored in the electricity storing portion 2 reaches the charge energy upper limit value CPhigh (in joules, J).

The charge energy upper limit value CPhigh (in joules, J) is obtained by adding the energy of self-discharge of the electricity storing portion 2 to the fully open return charging electric power, which is the energy required to return the valve 200 to a desired opening position (the fully closed position in the embodiment) from the fully open position. Practically, it is enough to set this upper limit value to the value obtained by increasing the fully open return charging electric power by several tens of percent.

When CP≥CPhigh holds, that is, the energy CP (in joules, J) stored in the electricity storing portion 2 is equal to or more than the charge energy upper limit value CPhigh (in joules, J) (YES in step S112), the charge controlling portion 80 stops the outputting of the charge enable signal and causes the charging portion 3 to stop the charging of the electricity storing portion 2 (step S113 in FIG. 3).

Now, the operation of the controlling portion 8 when the electric power is turned on is completed and then normal operation is performed.

Figure 5:
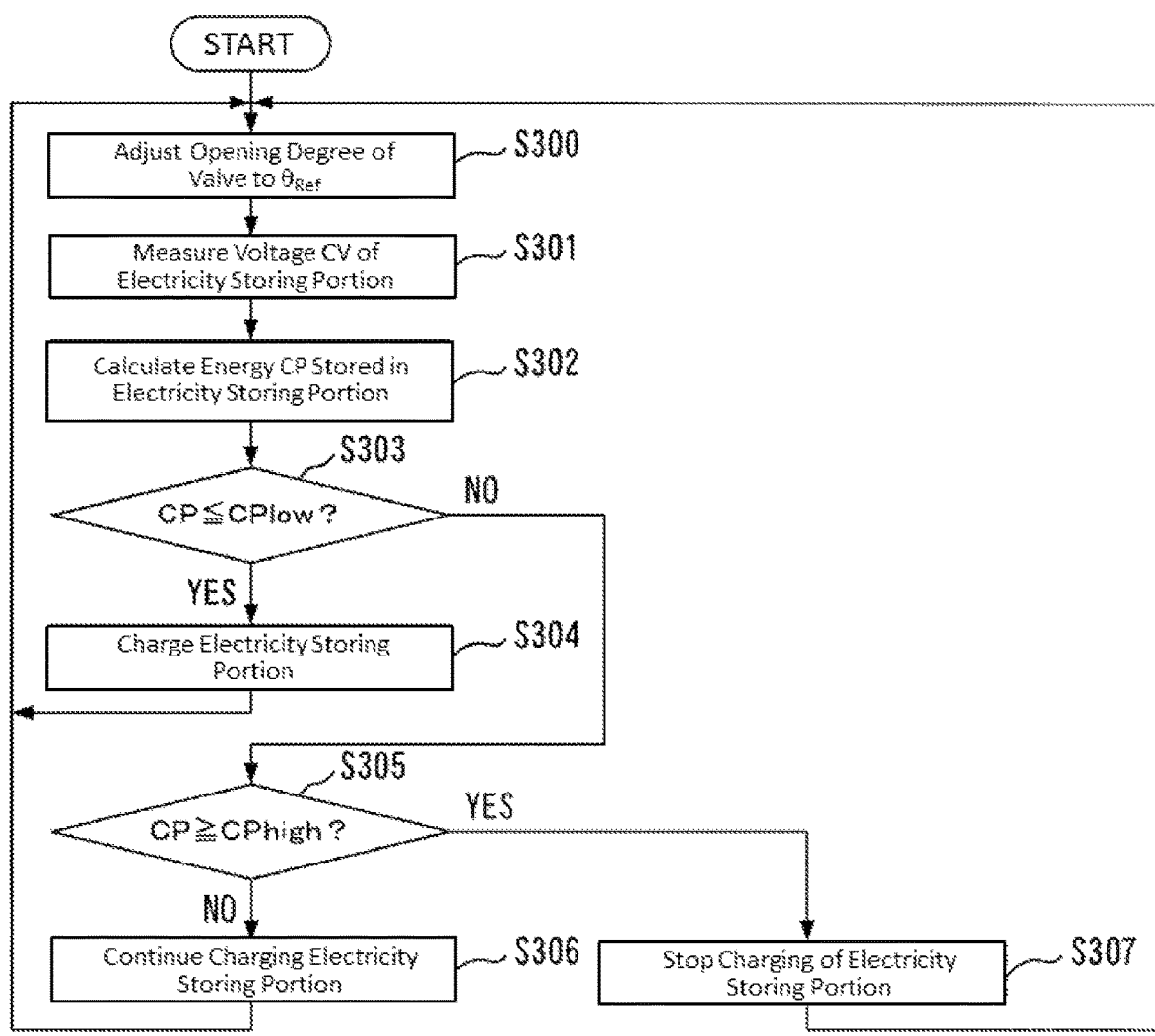
FIG. 5 is a flowchart illustrating the operation of the electric actuator according to the first embodiment of the invention in normal times.

FIG. 5 is a flowchart illustrating the operation of the electric actuator 100 in normal times. The processing (step S300 in FIG. 5) for adjusting the opening degree of the valve 200 to $\theta_{ref}$ (in degrees, °) is the same as in step S111. It will be appreciated that, if necessary, the controller changes the opening degree target value $\theta_{ref}$ (in degrees, °) as appropriate.

Next, the charge energy calculating portion 86 of the controlling portion 8 measures the stored voltage CV (in volts, V) of the electricity storing portion 2 (step S301 in FIG. 5). Then, as in step S107, the charge energy calculating portion 86 calculates the energy CP (in joules, J) stored in the electricity storing portion 2 using expression (4) based on the capacity value CC (in farads, F) of the electricity storing portion 2 calculated by the capacity calculating portion 85 in step S105 and the stored voltage CV (in volts, V) measured in step S301 (step S302 in FIG. 5).

When CP≤CPlow holds, that is, the energy CP (in joules, J) stored in the electricity storing portion 2 is equal to or less than a predetermined charge energy lower limit value CPlow (in joules, J) (YES in step S303 in FIG. 5), the charge controlling portion 80 of the controlling portion 8 outputs the charge enable signal to the charging portion 3 and causes the charging portion 3 to start the charging of the electricity storing portion 2 (step S304 in FIG. 5).

In this way, the processing from step S300 to S304 is repeatedly executed until the energy CP (in joules, J) stored in the electricity storing portion 2 exceeds the charge energy lower limit value CPlow (in joules, J).

The charge energy lower limit value CPlow (in joules, J) is the fully open return charging electric power, which is the energy required to return the valve 200 to a desired opening position (the fully closed position in the embodiment) from the fully open position.

When CP>CPlow holds, that is, the energy CP (in joules, J) stored in the electricity storing portion 2 exceeds the charge energy lower limit value CPlow (in joules, J) (NO in step S303), the charge controlling portion 80 decides whether the energy CP (in joules, J) is equal to or more than the predetermined charge energy upper limit value CPhigh (in joules, J) (step S305 in FIG. 5).

When CP<CPhigh holds, that is, the energy CP (in joules, J) stored in the electricity storing portion 2 does not reach the charge energy upper limit value CPhigh (in joules, J) (NO in step S305), the charge controlling portion 80 continues outputting the charge enable signal and causes the charging portion 3 to continue charging the electricity storing portion 2 (step S306 in FIG. 5).

In this way, the processing from step S300 to S306 is repeatedly executed until the energy CP (in joules, J) stored in the electricity storing portion 2 reaches the charge energy upper limit value CPhigh (in joules, J).

When CP≥CPhigh holds, that is, the energy CP (in joules, J) stored in the electricity storing portion 2 is equal to or more than the charge energy upper limit value CPhigh (in joules, J) (YES in step S305), the charge controlling portion 80 stops the outputting of the charge enable signal, causes the charging portion 3 to stop the charging of the electricity storing portion 2 (step S307 in FIG. 5), and returns to step S300. The above processing in FIG. 5 is continued until the electric power is shut off.

Figure 6:
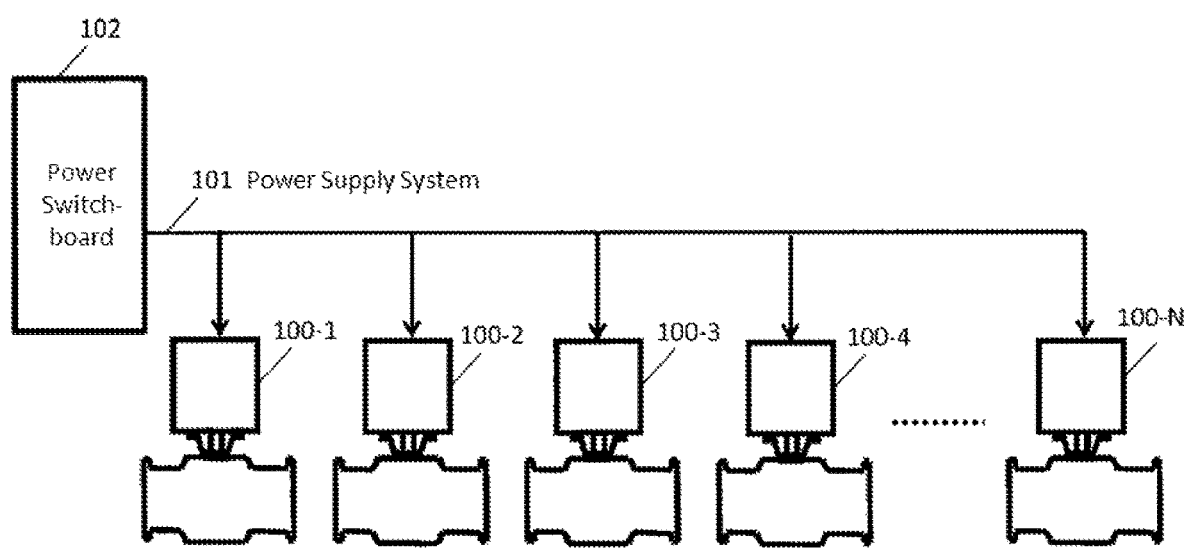
FIG. 6 illustrates the structure of a system in which the plurality of electric actuators according to the first embodiment of the invention is connected to one power supply system.
Figure 7:
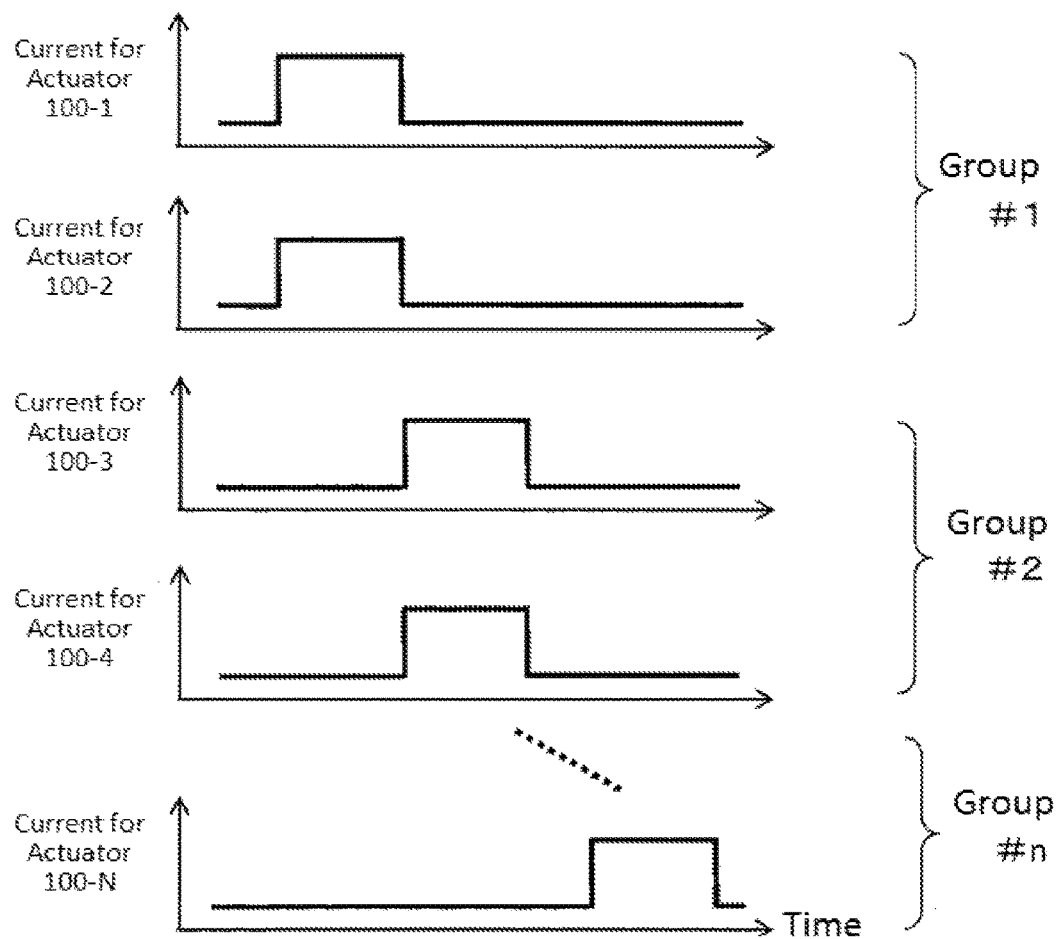
FIG. 7 shows a series of graphs used to describe how charge current flows through one power supply system to which the plurality of electric actuators according to the first embodiment of the invention are connected.

Next, how to set the charge number CN in the embodiment will be described. In the embodiment, when the plurality of electric actuators 100-1 to 100-N are connected to one power supply system 101, as illustrated in FIG. 6, the electric actuators 100-1 to 100-N are divided into a plurality of groups and the charge numbers CN that differ for each of the groups are set for the electric actuators 100-1 to 100-N to optimize the current capacity and the charge time. Accordingly, the electricity storing portions 2 are charged for each of groups #1, #2, ..., # n in the embodiment, as illustrated in FIG. 7.

When design is performed with significance placed on the current capacity value of the power supply system 101, the maximum number GCN of the electric actuators 100 included in one group is calculated using the following expression (6) based on the maximum allowable current capacity value LMI (in amperes, A) of the power supply system 101 and the current value CI (in amperes, A) flowing from the power supply system 101 to the electric actuators 100 when the electricity storing portions 2 of the electric actuators 100 are being charged.

$$GCN = LMI/CI \quad (6)$$

It should be noted here that, properly speaking, the maximum number GCN to be obtained is an integer value obtained by dropping the fractional portion of the calculation result of expression (6). As the method for charging the electricity storing portion 2 using the charging portion 3, there are the constant current charging method and the method (method in which the charge current changes with time) that charges the electricity storing portion 2 using an RC series circuit comprising a resistor of the charging portion 3 and an electric double layer capacitor of the electricity storing portion 2.

Figures 8A, 8B:
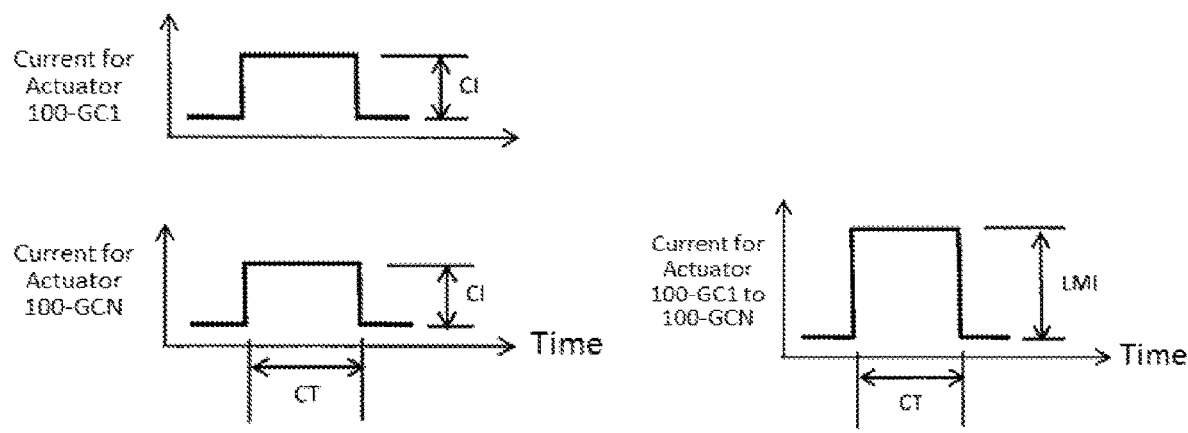
FIGS. 8(A) and 8(B) are graphs used to describe a constant current charging method.

In the constant current charging method, since constant current CI flows through each of the GCN electric actuators 100 (100-GC1 to 100-GCN) from the power supply system 101, as illustrated in FIG. 8 (A), a total current of LMI flows (FIG. 8 (B)). In other words, it is enough to determine the number GCN so that the total current flowing from the power supply system 101 to the GCN electric actuators 100-GC1 to 100-GCN is equal to or less than LMI.

In contrast, in the charging method that uses an RC series circuit, current of up to CI flows through each of GCN electric actuators 100 (100-GC1 to 100-GCN), as illustrated in FIG. 9 (A). Accordingly, it is enough to determine the number GCN so that the maximum value of the total current flowing from the power supply system 101 to the GCN electric actuators 100-GC1 to 100-GCN is equal to or less than LMI.

Next, the number GN of groups is calculated using the following expression (7) based on the number N of the electric actuators 100 connected to one power supply system 101 and GCN calculated by expression (6).

$$GN = N/GCN \quad (7)$$

It should be noted here that, properly speaking, the number GN of groups to be obtained is the integer value obtained by rounding up the fractional portion of the calculation result of expression (7). The power supply system maximum charge time LMCT required to charge the electricity storing portions 2 of the N electric actuators 100 is represented by the following expression (8).

$$LMCT = GN \times CT \quad (8)$$

Expression (8) indicates that the total charge time required when the electricity storing portions 2 of the electric actuators 100 are charged for each of groups #1 to # GN is LMCT, as illustrated in FIG. 10.

In this way, the designer only needs to divide the N electric actuators 100 into the groups #1 to # GN so that the total current flowing from the power supply system 101 to the electric actuators 100 is equal to or less than the maximum allowable current capacity value LMI (the number of the electric actuators 100 included in one group is equal to or less than GCN calculated by expression (6)) and the electric actuator 100 having a higher priority is charged earlier, and preset the charge numbers CN corresponding to the groups #1 to # GN for the electric actuators 100-1 to 100-N.

Next, the design method that places significance on the power supply system maximum charge time LMCT will be described. First, the maximum number GCN of the electric actuators 100 included in one group is calculated using the following expression (9) based on the power supply system maximum allowable charge time LMCT and the standard charge time CT.

$$GCN = LMCT/CT \quad (9)$$

That is, it is enough to determine the maximum number GCN so that the total time required to charge the electricity storing portions 2 of the N electric actuators 100 is equal to or less than LMCT. It should be noted here that the maximum number GCN to be obtained is the integer value obtained by dropping the fractional portion of the calculation result of expression (9), as in expression (6).

Next, the number GN of groups is calculated using expression (7) based on the number N of the electric actuators 100 connected to one power supply system 101 and GCN calculated by expression (9). As described above, the number GN of groups to be obtained is the integer value obtained by rounding up the fractional portion of the calculation result of expression (7). The maximum current capacity value LMI (in amperes, A) of the power supply system 101 is obtained by the following expression.

$$LMI = GCN \times CI \quad (10)$$

As described above, constant current CI (in amperes, A) flows from the power supply system 101 to the electric actuators 100 in the group being charged in the constant current charging method and current of up to CI (in amperes, A) flows through the electric actuators 100 in the charging method that uses an RC series circuit.

In this way, the designer only needs to divide the N electric actuators 100 into the groups #1 to # GN so that the total time required to charge the electric actuators 100 is equal to or less than the power supply system maximum allowable charge time LMCT (the number of the electric actuators 100 included in one group is equal to or less than GCN calculated by expression (9)) and the electric actuator 100 having a higher priority is charged earlier, and preset the charge numbers CN corresponding to the groups #1 to # GN for the electric actuators 100-1 to 100-N.

This can make design that optimizes the current capacity and the charge time and can set the charge numbers CN based on the design result for the electric actuators 100.

The priority described above is determined by, for example, a request of a facility in which the electric actuator 100 is installed.

Figure 11:
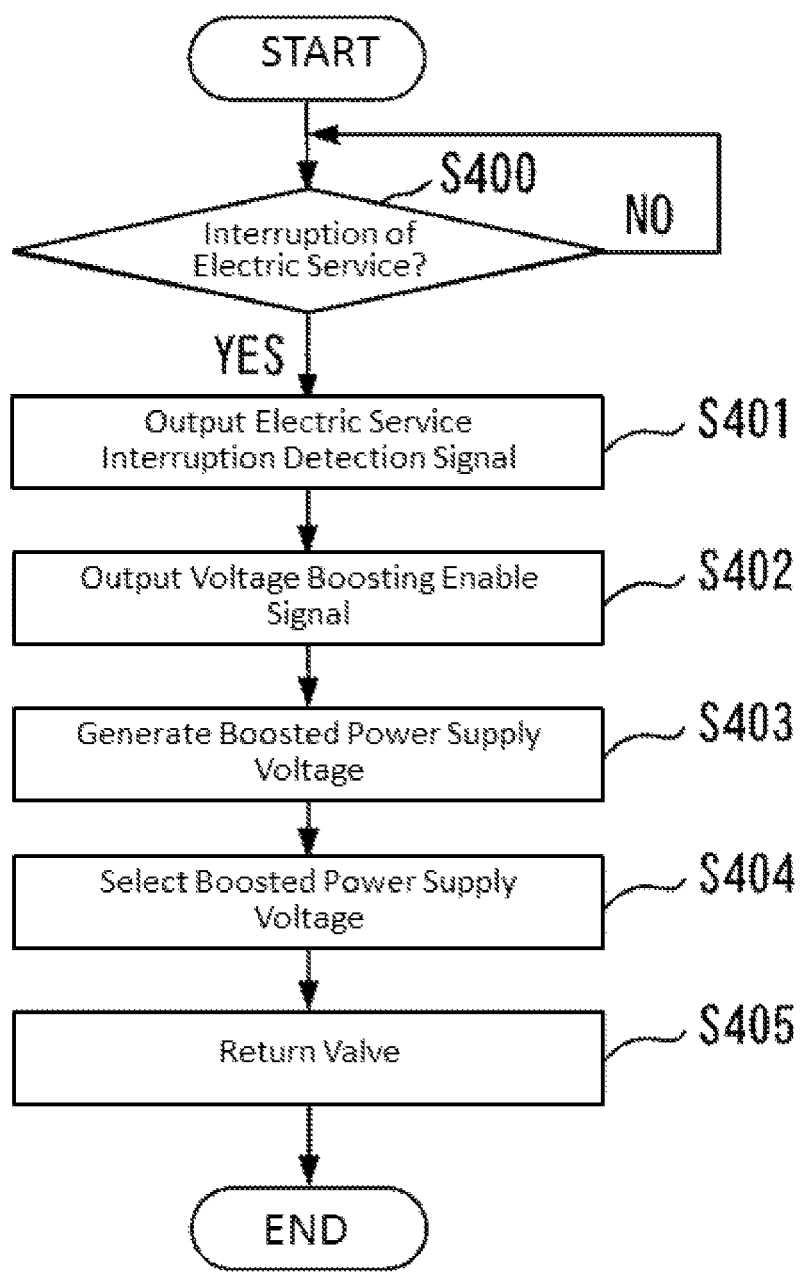
FIG. 11 is a flowchart illustrating the operation of the electric actuator according to the first embodiment of the invention when interruption of electric service occurs.

Next, the operation when interruption of electric service occurs will be described. FIG. 11 is a flowchart illustrating the operation of the electric actuator 100 when interruption of electric service occurs.

When the supply of the power supply voltage from the external power supply (a power switchboard 102 via power supply system 101 in FIG. 6) to the main power supply portion 1 is stopped for any reason (YES in step S400 in FIG. 11), since the main power supply portion 1 cannot generate the main power supply voltage, the electric service interruption detecting portion 5 outputs the electric service interruption detection signal (step S401 in FIG. 11).

The voltage boosting controlling portion 82 of the controlling portion 8 outputs the voltage boosting enable signal to the voltage boosting portion 4 immediately after the electric service interruption detecting portion 5 outputs the electric service interruption detection signal (step S402 in FIG. 11).

In response to the output of the voltage boosting enable signal, the voltage boosting portion 4 boosts the stored voltage (the inter-terminal voltage of the electric double layer capacitor) of the electricity storing portion 2 to a value equivalent to the main power supply voltage (step S403 in FIG. 11).

When the electric service interruption detecting portion 5 outputs the electric service interruption detection signal, the main power supply switching portion 6 selects and outputs the boosted power supply voltage from the voltage boosting portion 4 (step S404 in FIG. 11). This supplies the boosted power supply voltage to the control power supply portion 9 and the motor driving portion 11 via the main power supply switching portion 6. The control power supply portion 9 generates a predetermined control system power supply voltage by reducing the boosted power supply voltage.

Next, the return controlling portion 83 of the controlling portion 8 outputs the motor control signal to the motor driving portion 11 so that a desired opening position (the fully closed position in the embodiment) coincides with the actual opening of the valve 200 measured by the position sensor 13. The motor driving portion 11 outputs a driving voltage to the motor 10 according to the motor control signal. This drives the motor 10 and adjusts the opening degree of the valve 200. In this way, the valve 200 can be returned to a desired opening position (step S405 in FIG. 11).

Since the charging portion 3 starts charging of the electricity storing portion 2 when the charge waiting time CWT has elapsed after electric power is turned on in the embodiment, the current capacity required for the power supply system 101 and the power switchboard 102 and the total charge time of the electric actuators 100 can be optimized when the plurality of electric actuators 100 are connected to one power supply system 101.

In addition, as compared with a spring return actuator, the embodiment has advantages in that (I) a torque for winding a spring is not necessary, (II) the target position of the valve during occurrence of interruption of electric service can be set to the fully closed position, the fully open position, or another position, and (III) mechanisms, such as a clutch and brake, for controlling operation during occurrence of interruption of electric service are not necessary.

Since the current capacities of the power supply system 101 and the power switchboard 102 can be suppressed in the embodiment, a spring return actuator can be replaced with the electric actuator of the embodiment having various advantages, thereby achieving contribution to reduction in environmental load by reducing power consumption during operation and reducing a mechanism required for control during a return. In addition, application of the electric actuator of the embodiment can be extended to general industrial machines having a spring return actuator.

Second Embodiment

Figure 12:
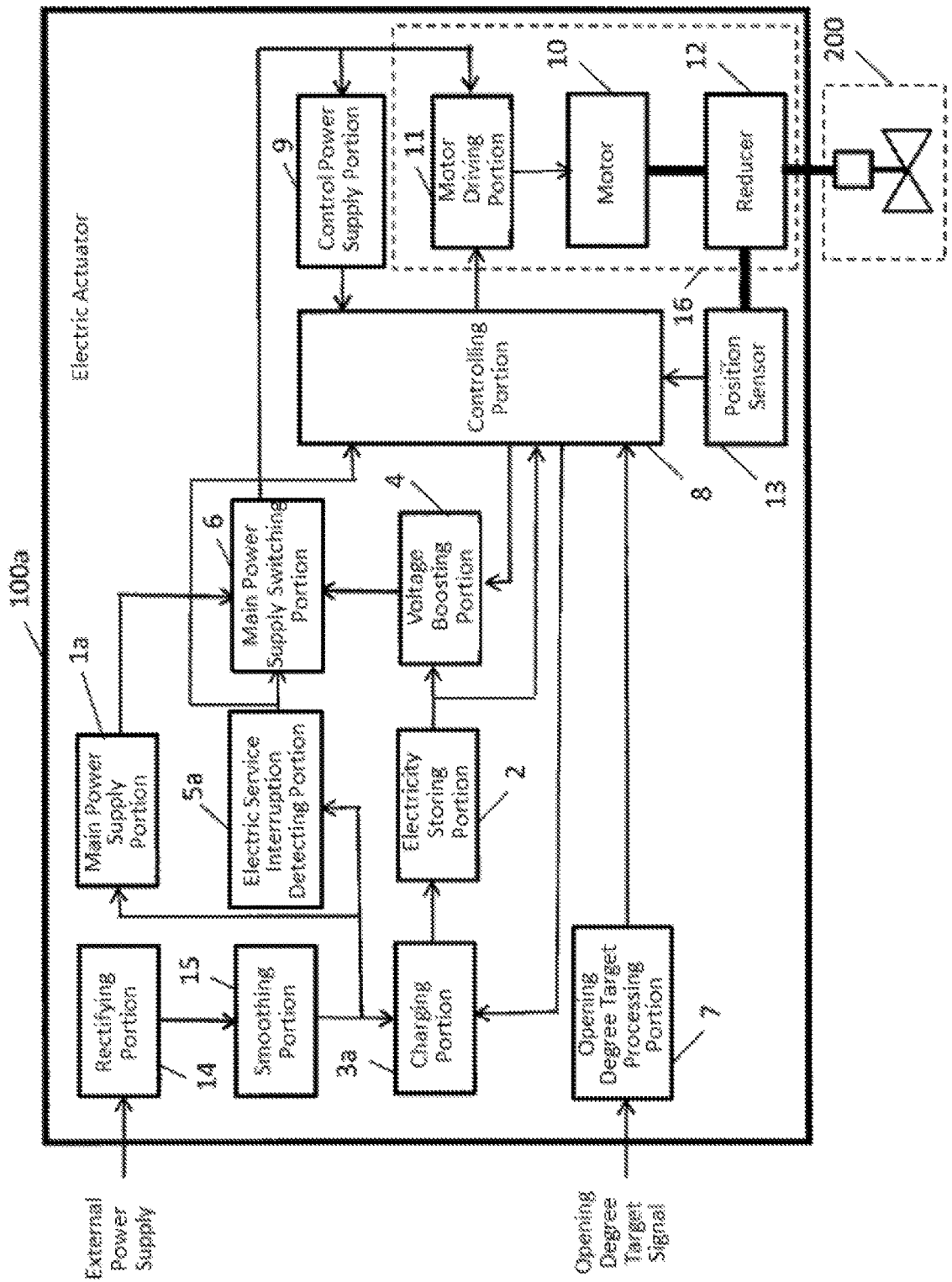
FIG. 12 is a block diagram illustrating the structure of an electric actuator according to a second embodiment of the invention.
Figure 13:
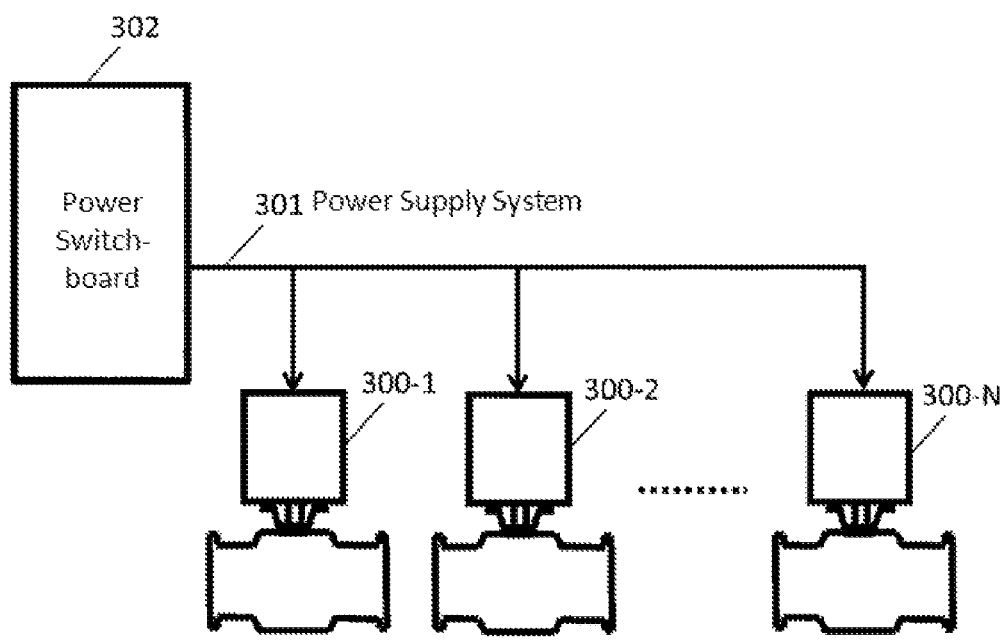
FIG. 13 illustrates the structure of a system in which a plurality of electric actuators are connected to one power supply system.
Figure 14:
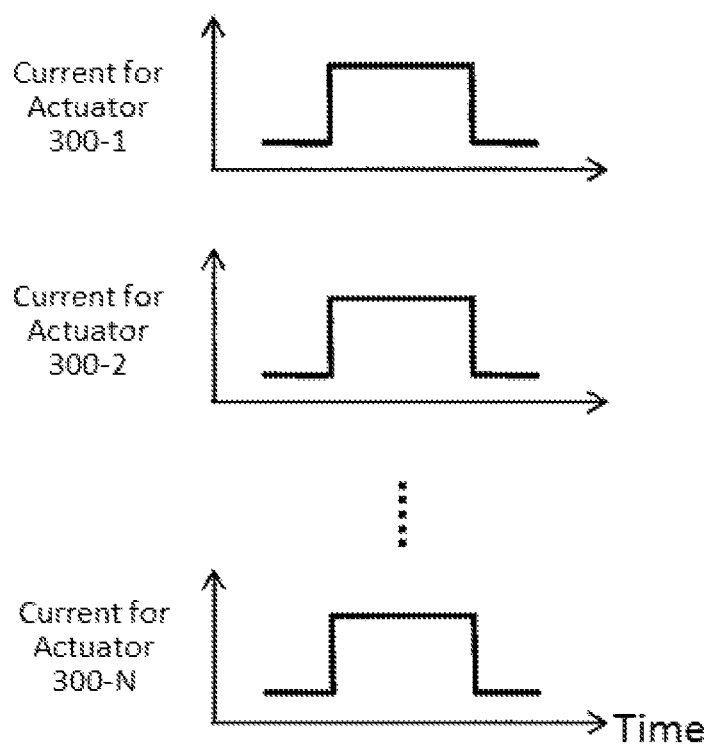
FIG. 14 shows a series of graphs used to describe how charge current flows through the power supply system all together when electricity storing portions of the plurality of electric actuators are charged at the same time.
Figure 15:
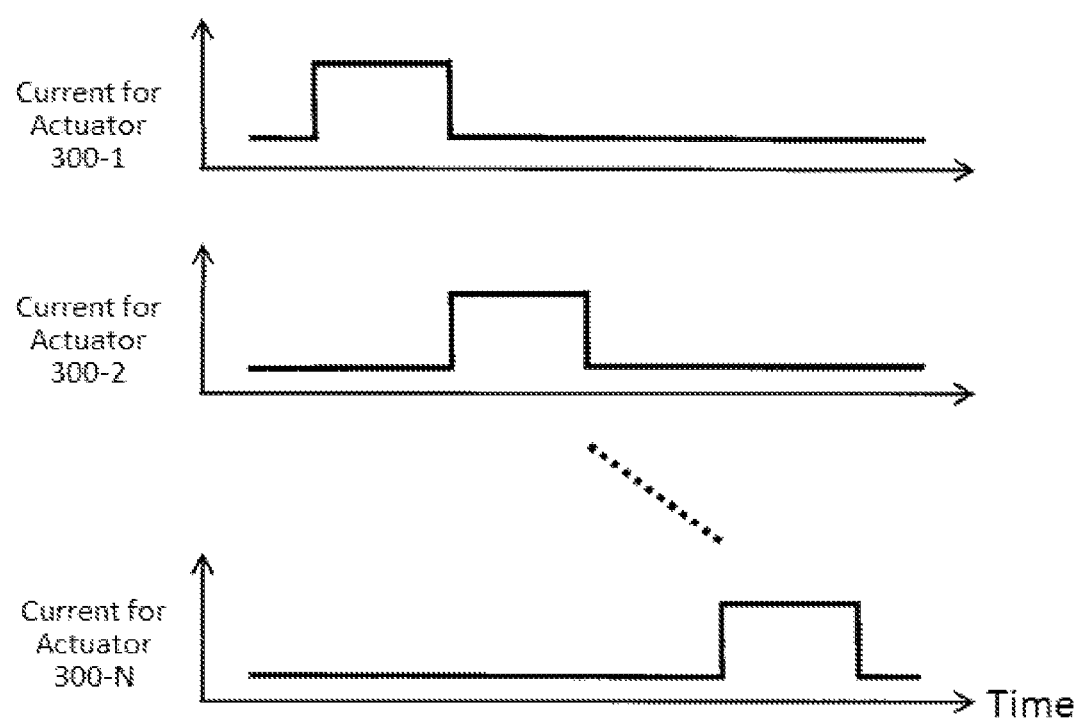
FIG. 15 shows a series of graphs used to describe how charge current flows through the power supply system in sequence when the electricity storing portions of the plurality of electric actuators are charged in sequence.

Next, the second embodiment of the invention will be described. FIG. 12 is a block diagram illustrating the structure of an electric actuator 100a according to the second embodiment of the invention and the same components as in FIG. 1 are given the same reference numerals. The electric actuator 100a according to the second embodiment comprises a main power supply portion 1a, the electricity storing portion 2, a charging portion 3a, the voltage boosting portion 4, an electric service interruption detecting portion 5a, the main power supply switching portion 6, the opening degree target processing portion 7, the controlling portion 8, the control power supply portion 9, the motor 10, the motor driving portion 11, the reducer 12, the position sensor 13, a rectifying portion 14 that rectifies the power supply voltage supplied from the external power supply (the power switchboard 102 via the power supply system 101 in FIG. 6), and a smoothing portion 15 that smooths a DC voltage rectified by the rectifying portion 14.

The first embodiment corresponds to a case in which the power supply voltage supplied from the external power supply is a high voltage of, for example, 85 VAC to 264 VAC. In contrast, the second embodiment corresponds to a case in which the power supply voltage supplied from the external power supply is a low voltage of, for example, 24 VAC.

The rectifying portion 14 rectifies the AC power supply voltage from the external power supply. The smoothing portion 15 smooths a pulsating DC voltage rectified by the rectifying portion 14.

The main power supply portion 1a according to the second embodiment generates the main power supply voltage as the main power supply portion 1 according to the first embodiment, except that the main power supply portion 1a receives a DC power supply voltage output from the smoothing portion 15.

The charging portion 3a charges the electricity storing portions 2 according to the charge enable signal from the controlling portion 8 as the charging portion 3 according to the first embodiment, except that the charging portion 3a receives the DC power supply voltage output from the smoothing portion 15.

The electric service interruption detecting portion 5a detects the shut-off of the electric power as the electric service interruption detecting portion 5 according to the first embodiment, except that the electric service interruption detecting portion 5a receives the DC power supply voltage output from the smoothing portion 15.

The other structure is the same as in the first embodiment.

In this way, the same effects as in the first embodiment can be obtained even in the electric actuator connected to a low voltage external power supply. Although the power supply voltage supplied from the external power supply is an AC voltage in the above example, it will be appreciated that the power supply voltage supplied from the external power supply may be a DC voltage.

In the first and second embodiments, the capacity calculating portion 85 and the charge energy calculating portion 86 are provided in the controlling portion 8 of the electric actuator 100 or 100a and, when the energy CP (in joules, J) stored in the electricity storing portion 2 is decided to be equal to or more than the charge energy upper limit value CPhigh (in joules, J), the charge controlling portion 80 stops charging. However, the charge controlling portion 80 may stop charging when the standard charge time CT elapses after the starting of charging, so the invention is not limited to the first and second embodiments.

In addition, although an electric double layer capacitor is used as an electricity storing element of the electricity storing portion 2 in the first and second embodiments, the electricity storing element is not limited to an electric double layer capacitor and, for example, an element capable of storing electricity, such as a lithium-ion capacitor, is applicable.

In addition, although the constant current charging method and the method that uses an RC series circuit have been described as methods used by the charging portion 3 to charge the electricity storing portion 2 in the first and second embodiments, another charging method may be used as long as CI and CT can be calculated.

In addition, although the charge number CN is stored in the storing portion 84 in the first and second embodiments, the charge number CN may be set by a DIP (dual in-line package) switch. In this case, the controlling portion 8 only needs to obtain the charge number CN by reading the setting of the DIP switch.

The controlling portion 8 according to the first and second embodiments can be achieved by a computer comprising a CPU (central processing unit), a memory device, and an interface communicating with the outside and programs that control such hardware resources. The CPU executes the processing described in the first and second embodiments by following programs stored in the memory device.

INDUSTRIAL APPLICABILITY

The invention is applicable to techniques for charging electricity storing portions of electric actuators.

DESCRIPTION OF REFERENCE NUMERALS AND SIGNS 1, 1a: main power supply portion; 2: electricity storing portion; 3, 3a: charging portion; 4: voltage boosting portion; 5, 5a: electric service interruption detecting portion; 6: main power supply switching portion; 7: opening degree target processing portion; 8: controlling portion; 9: control power supply portion; 10: motor, 11: motor driving portion; 12: reducer; 13: position sensor; 14: rectifying portion; 15: smoothing portion; 16: driving portion; 80: charge controlling portion; 81: opening degree controlling portion; 82: voltage boosting controlling portion; 83: return controlling portion; 84: storing portion; 85: capacity calculating portion; 86: charge energy calculating portion; 87: required energy calculating portion; 100, 100a: electric actuator; 200: valve; 101: power supply system; 102: power switchboard

The invention claimed is:

1. An electric actuator comprising:
an opening degree controlling portion that controls an opening degree of a valve according to an opening degree target value when the electric actuator is energized by receiving electric power from a power source;
an electricity storing portion that stores electric energy;
a charging portion that charges the electricity storing portion when the electric actuator is energized;
a return controlling portion that operates the valve to a predetermined opening position using the electric energy stored in the electricity storing portion when interruption of electric service occurs and the electric power from the power source is interrupted; and
a charge controlling portion that causes the charging portion to start charging of the electricity storing portion when a charge waiting time determined according to a priority of charging has elapsed after the electric power is turned on; and
a storing portion that stores, in advance, a charge number corresponding to the priority and a charge time required to charge the electricity storing portion,
wherein the charge controlling portion calculates a charge waiting time based on the charge number and the charge time and causes the charging portion to start charging of the electricity storing portion when the charge waiting time has elapsed after the electric power is turned on, and
wherein, when a plurality of the electric actuators are connected to one power supply system, the electric actuators are divided into groups so that a total current flowing from the power supply system to the electric actuators is equal to or less than a maximum allowable current capacity value and the electric actuator having a higher priority is charged earlier, and the charge number corresponding to each of the groups is preset in the storing portion.

2. An electric actuator comprising:
an opening degree controlling portion that controls an opening degree of a valve according to an opening degree target value when the electric actuator is energized by receiving electric power from a power source;
an electricity storing portion that stores electric energy;
a charging portion that charges the electricity storing portion when the electric actuator is energized;
a return controlling portion that operates the valve to a predetermined opening position using the electric energy stored in the electricity storing portion when interruption of electric service occurs and the electric power from the power source is interrupted; and
a charge controlling portion that causes the charging portion to start charging of the electricity storing portion when a charge waiting time determined according to a priority of charging has elapsed after the electric power is turned on; and
a storing portion that stores, in advance, a charge number corresponding to the priority and a charge time required to charge the electricity storing portion,
wherein the charge controlling portion calculates a charge waiting time based on the charge number and the charge time and causes the charging portion to start charging of the electricity storing portion when the charge waiting time has elapsed after the electric power is turned on, and wherein, when a plurality of the electric actuators are connected to one power supply system, the electric actuators are divided into groups so that a total time required to charge the electric actuators is equal to or less than a maximum allowable charge time and the electric actuator having a higher priority is charged earlier, and the charge number corresponding to each of the groups is preset in the storing portion.

* * * * *